June 16, 1925.
H. L. STRONGSON
CABLE BOX
Filed April 29, 1922
1,542,421
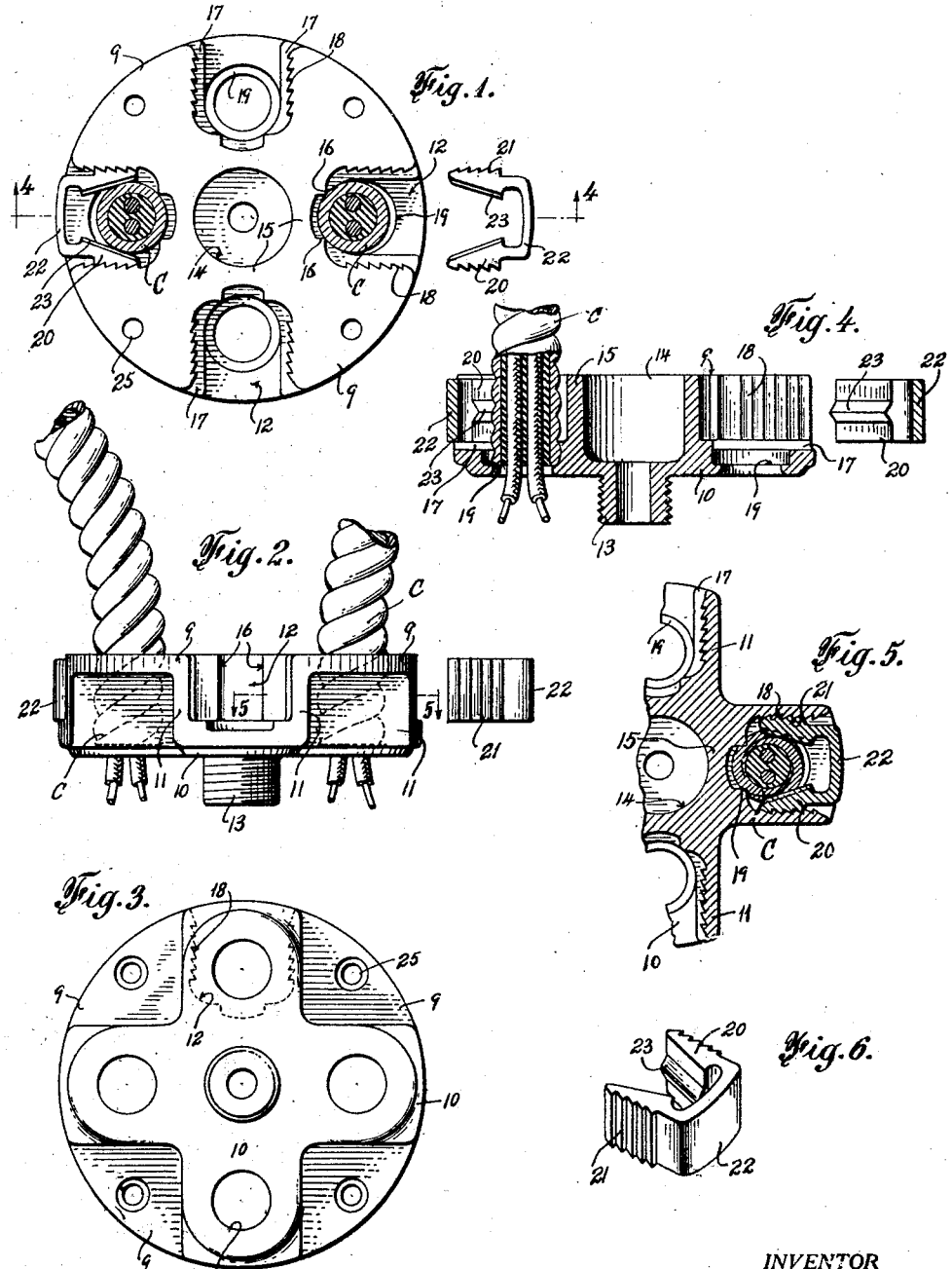
INVENTOR
Herman L. Strongson
BY
James C. Ledbetter ATTORNEY Patented June 16, 1925.

1,542,421

UNITED STATES PATENT OFFICE.

HERMAN L. STRONGSON, OF BROOKLYN, NEW YORK, ASSIGNOR, BY MESNE ASSIGNMENTS, TO THE THOMAS & BETTS CO., OF ELIZABETH, NEW JERSEY, A CORPORATION OF NEW JERSEY.

CABLE BOX.

Application filed April 29, 1922. Serial No. 557,366.

*To all whom it may concern:*

Be it known that I, HERMAN L. STRONGSON, a citizen of the United States, residing at Brooklyn, in the county of Kings and State of New York, have invented certain new and useful Improvements in Cable Boxes, of which the following is a specification.

This invention relates to improvements in cable and outlet boxes, fasteners, anchorages and the like used generally in building construction and electrical installations.

An object of the invention is to produce an improved cable box construction simple and economical to manufacture and which comprises few parts requiring no machine work, fitting, or assembling in completing and making it ready for use; and in addition, it is an object to produce an improved cable box together with an improved locking plug, the resulting parts being of such simple design and construction that the two parts are joined together without screws or other machine fastenings to securely anchor a cable to the box.

A cable box constructed in accordance with the plans of this invention comprises a single piece casting or box, having open spaces or sockets for the reception of cable ends, and a locking plug is adapted to be driven into the open socket space and jammed against the cable positively anchoring the cable in the box.

The accompanying drawings show an embodiment of my invention and though a preferred form of construction is illustrated, I claim a right of protection as to such changes as obviously come within the scope of my invention.

In the accompanying drawings Figures 1, 2 and 3 illustrate respectively a top, side and bottom projection of the cable box; and cable or conduits are shown in connection with the first two figures.

Figure 4 illustrates a cross sectional view taken on the line 4—4 of Figure 1.

Figure 5 illustrates a sectional view taken on the line 5—5 of Figure 2.

Figure 6 illustrates a perspective view of an improved locking plug which is driven into the cable box socket opening to lock both itself and cable in permanent position.

Referring now more particularly to the drawings for a detail description of the cable box, a one-piece casting comprises a series of upper walls 9 integral with a circular wall 15 which forms a central hole 14, and the wall surfaces 9 are made parallel with a lower wall 10, and the top part 9 and bottom part 10 of the casting are connected by a series of transverse walls or webs 11. The webs are arranged in pairs and spaced apart to form a plurality of open cable end receptacle sockets 12. The design and construction of the parallel webs 11 joining with the circular wall 15 and the upper and lower parts 9 and 10, causes the cable opening 12 to assume a U-shaped design with an opening at the outer circumference of the casting for the reception of a plug and an opening on top for the reception of a cable. The single piece casting is made circular or round in form and has a threaded boss 13 projecting from the face of the casting. The hole or opening 13 extends thru the cast box to the threaded boss 13 which provides a wall 15 forming the inner side of the cable sockets 12.

The circular wall 15 is made with several, preferably two, sharp edged ribs or ridges 16 which extend vertical and parallel to the axis of the cable box. Shoulders 17 are formed in the corners of the openings 12 which extend from the circumference of the box back to the wall 15. The inner parallel surfaces of the webs 11 are made with ridge teeth or corrugations 18 which teeth extend vertically from the shoulder 17 to the wall surface 9. A depression or cylindrical socket 19 is made in the wall 10 within the bounds of the U-shaped opening 12. This socket 19 is set back somewhat from the edge or circumference of the box and a continuation of the parallel shoulders 17 extend around the socket 19 forming part of the wall of this shallow centering socket 19 useful in maintaining the cable end in position while the locking plug is being driven in as later seen.

A locking plug or anchor plug is designed to be driven inwardly to close the U-shaped opening and lock a cable therein; and the said plug comprises a forked toothed or corrugated device with a head by which it is driven into the opening, and more particularly comprises a forked or U-shaped plug of two outspread wedges 20 corrugated or toothed as at 21 on the outer surfaces thereof and having a connecting web or head 22. The outer toothed surfaces 21 are preferably made parallel while the inner faces of the parts or forks are disposed at an angle which forms the wedge-shaped design as shown in the drawings. A rib or ribs 23 are disposed on the inner faces of the wedge parts 20, and these ribs extend parallel to the plane of the walls or faces 9 and 10 of the box are right-angular to the axis of the cable anchored to the box. It is to be observed that the ribs 16 of the box are disposed right-angular to the ribs 23 of the plug 22. The toothed construction of the plug 22 and the open-sided socket 12 are formed for the purpose of causing the plug to lock within the U-shaped opening.

The plug 22 is preferably made of material which possesses a characteristic of yieldability or springingness in order that the wedge parts 20 may contract or yield inwardly as the plug is driven inwardly toward the center of the cable box. This plug is manufactured by casting as may be true with the box part, and it is desirable on the part of the manufacturer, though the box itself be cast of grey iron, that the said plug should preferably be cast of a metal which possesses spring qualities, such as malleable iron, and requiring a malleable property the plug may be stamped, or working as well if hard to impart spring characteristics thereto, it may be cast as aforesaid.

The cable box is, an usual with these devices, provided with holes 25 near the outer rim by which it is secured to the ceiling or the wall of a building where electrical conduits are being installed, and the aforesaid boss 13 is designed as a point of support to hold fixtures or electrical chandeliers and the like.

The cable ends C to be anchored to the box are inserted in the U-shaped openings 12 with the end thereof resting within the sockets 19. The plug 22 is inserted in the opening 12 and driven home by several sharp blows of a hammer whereby the cable is jammed inwardly against the sharp edge of the ribs 16, and the ribs 23 on the plug cut or indent the armored wall of the electrical cable conduit C to such an extent that the combined holding effort of all the ribs is so effective that the cable is permanently anchored to the box. An advantage, among others, is that thoroughly good electrical ground connection is established between the cable and box by reason of the direct biting engagement between the plug and cable. Some electrical cables are manufactured with a spiral overlapping metal armor which provides a thread-like spiral groove in the cable; and the plug ribs 23, or usually one of them, find its way into the spiral groove of the armored cable whereby the said cable is still further and more securely locked in position. As the plug is driven inwardly, its inner wedge-shaped surface or ribs 23 engage and slide upon the electrical cable C whereby the wedge parts 20 of the plug are caused to expand outwardly thereby more firmly engaging the corrugated or toothed surfaces 18 and 21. When the plug has very nearly reached its inwardly limited position, usually one or more additional hammer blows will force the plug one or two teeth further because the cable wall will give inwardly sufficient to admit the said wedge plug to advance one more tooth, whereupon the cable wall quickly expands causing the ratchet to again seat in locked position.

It is to be observed that the plug slides inwardly on the shoulders 17 thereby leaving a slight clearance space between the plug and the wall 10 of the box. A screw driver or tool may be inserted in this space for the purpose of prying the plug out of the U-shaped opening or socket 12. Once the plug is driven home and securely anchored in position, it is more or less difficult to ever effect a disengagement of the plug and cable box, but as aforesaid, the plug can be pryed out and thereafter a new plug or the old one can be driven back into the same place to again lock the cable.

It will be observed that in the manufacture of this cable box, there are no machine operations to perform on either the plug or the box, because both parts are cast and do not require any fitting or assembling operations. Furthermore, the box is economical in the use of locking plugs because even though several cable sockets are provided in the box, it is only necessary to use a plug for each cable anchored to the box and therefore a saving is effected on the part of the purchaser inasmuch as he may buy the boxes and the plugs separately, using one or more plugs in each box depending on the number of cables to be fastened to the box.

Having described the invention what I claim is:

1. In cable anchorages, boxes, and the like, a box having a socket depression made in a wall thereof to support a cable end, said socket including spaced parallel side walls, and a forked plug slidable along the walls to embrace the cable, and held in position by surface engagement between the plug forks and the box wall.

2. In cable boxes and the like, a box having a depression made in a wall thereof to support a cable end, spaced parallel straight side walls disposed alongside the depression and between which the cable end is placed, a resilient forked plug sidable along the walls to straddle and engage the cable, and ratchet teeth made on the plug and side walls to lock the plug.

3. In cable boxes and the like, a box having a depression made in a wall thereof to support a cable end, spaced webs defining the depression, a plug slidable along the webs to engage the cable, and ratchet means established between the webs and plug to hold the plug against the cable.

4. In cable boxes and the like, a casting having an opening, teeth formed in the said opening, a resilient locking plug slidable into the opening and held by the teeth.

5. In cable boxes and the like, a cylindrical casting said casting having a U-shaped opening made therein and extending toward the center of the casting with the opening at the periphery of the box to receive a cable end, and a U-shaped plug anchored in the U-shaped opening by a frictionally driving fit against the wall of the opening to jam the plug and cable against said wall.

6. In cable boxes and the like, a cylindrical casting, said casting having a U-shaped opening to receive a cable end, a resilient locking plug, ratchet teeth formed between the plug and opening whereby the plug when driven into the opening undergoes a step by step ratchet locking action.

7. Improvements in cable boxes and the like, a box having a cable socket made therein, said socket being made open at the periphery of the box, and a forked plug disposed in the opening to straddle and anchor the cable to the box, and said plug frictionally gripping the cable socket.

8. Improvements in cable boxes and the like, a casting having a cable socket made therein, a forked plug disposed in and engaging the socket to straddle and lock the cable to the casting, ribs made in the socket and on the forked plug which are embedded in the cable when the forked plug is driven inwardly, and said plug frictionally gripping the cable socket walls.

9. Improvements in cable boxes and the like, a box having a socket with a top opening to receive a cable end and side openings to receive a forked driven plug, an inner wall support bounding the socket against which the cable rests, a locking device for holding the plug within the socket and against the cable, comprising plug means frictionally gripping the socket wall.

10. In cable boxes and the like, spaced parallel walls, a transverse web disposed between the walls to form a cable receiving space having a top opening for receiving a cable end and a side opening for the reception of a locking plug, and a forked wedge-shaped locking plug disposed in the side opening, and anchored therein by frictional engagement with the box wall.

11. In cable boxes and the like, spaced parallel walls, transverse webs disposed between the walls to form a cable receiving space having a top opening for receiving a cable end and a side opening for the reception of a locking plug, a forked wedge-shaped locking plug slidable into the side opening, and ratchet teeth formed between the locking plug and webs to effect permanent anchorage of the plug.

12. In cable boxes and the like having a suitable opening to receive a cable end, a shoulder made in the opening, and a plug slidable into the opening along the shoulder whereby clearance is provided between the locking plug and cable box for the reception of a tool used to pry out the locking plug.

13. In cable boxes and the like, a casting having an opening to receive cable ends, a driving head, spaced wedge-shaped parts made on the driving head and adapted to be forced into the opening by hammering on the head.

14. In cable boxes and the like, a one piece casting having a plurality of cable receiving sockets, a two-armed locking plug, a driving head made on the locking plug, ribs formed on the inside of each arm of the two-armed locking plug straddling the cable and said plug frictionally driven into the socket causing the ribs to bite into the cable.

15. In cable boxes and the like, a body piece having U-shaped spaces for the reception of a cable end, a wall covering one side of the U-shaped space and acting as a rest against which the cable end is seated, a U-shaped plug to drive into the space and lock the cable to the body piece, and said plug designed to tightly fit into the U-shaped space and remain there by coacting wall pressure engagement.

In testimony whereof I affix my signature this 28th day of April, 1922, in the State of New York, county of New York, city of New York.

HERMAN L. STRONGSON.